(12) United States Patent
Freytag (10) Patent No.: US 10,526,031 B2
(45) Date of Patent: Jan. 7, 2020

(54) FENDER ASSEMBLY FOR A TRACTOR

(71) Applicant: AGCO International GmbH, Neuhausen (CH)

(72) Inventor: Erich Freytag, Sachsenried (DE)

(73) Assignee: AGCO International GmbH, Neuhausen (CH)

( * ) Notice: Subject to any disclaimer, the term of this patent is extended or adjusted under 35 U.S.C. 154(b) by 129 days.

(21) Appl. No.: 15/804,573

(22) Filed: Nov. 6, 2017

(65) Prior Publication Data

US 2018/0127039 A1    May 10, 2018

(30) Foreign Application Priority Data

Nov. 7, 2016 (GB) .................................. 1618742.9

(51) Int. Cl.
| | |
|---|---|
| *B60K 15/06* | (2006.01) |
| *B60K 15/073* | (2006.01) |
| *B62D 25/16* | (2006.01) |
| *B62D 25/18* | (2006.01) |
| *B62D 63/04* | (2006.01) |

(Continued)

(52) U.S. Cl.
CPC ............ *B62D 63/04* (2013.01); *B60K 15/073* (2013.01); *B60R 11/06* (2013.01); *B62D 25/166* (2013.01); *B62D 25/182* (2013.01); *B62D 55/08* (2013.01); *B60R 2011/004* (2013.01)

(58) Field of Classification Search
CPC .. B62D 25/182; B62D 25/184; B62D 25/186; B62D 25/16; B62D 25/163; B62D 25/166; B62D 25/168; B62D 25/188; B60K 15/073; B60K 15/067

USPC ...... 180/89.17; 296/198; 280/830, 831, 834, 280/157, 847, 848, 853; 293/28, 58, 106, 293/118, 119
See application file for complete search history.

(56) References Cited

U.S. PATENT DOCUMENTS

| | | | | |
|---|---|---|---|---|
| 923,849 | A | * | 6/1909 | Jones |
| 1,417,813 | A | * | 5/1922 | Fairclough ........... B62D 25/182 |
| | | | | 280/154 |

(Continued)

FOREIGN PATENT DOCUMENTS

| | | |
|---|---|---|
| CN | 203876840 U | 10/2014 |
| CN | 104417623 A | 3/2015 |

(Continued)

OTHER PUBLICATIONS

UK Intellectual Property Office, International Search Report for Priority Application No. 1618742.9, dated Mar. 3, 2017.

(Continued)

*Primary Examiner* — Anne Marie M Boehler (57) ABSTRACT

A fender assembly for a tractor, as well as a tractor having such a fender assembly. The fender assembly is constructed as first and second fender parts, connected via a rail. The rail has a partial spiral or helical shape. As a result, the second fender part is moveable on the rail along a path substantially parallel to a portion of the circumference of a wheel of the tractor, in a direction downwardly and outwardly relative to the first fender part. This provides a fender assembly allowing for improved access to tractor components located inboard of the fender assembly, as well as allowing for ease of access to the second fender part for an operator standing on the ground adjacent the tractor.

13 Claims, 8 Drawing Sheets

(51) Int. Cl.
B60R 11/06 (2006.01)
B62D 55/08 (2006.01)
B60R 11/00 (2006.01)

(56) References Cited

U.S. PATENT DOCUMENTS

| | | | | |
|---|---|---|---|---|
| 1,421,050 | A * | 6/1922 | Washington | B60K 15/06 |
| | | | | 220/23.83 |
| 3,396,983 | A * | 8/1968 | Massey | B62D 49/06 |
| | | | | 239/142 |
| 3,560,021 | A * | 2/1971 | Watson | B62D 25/168 |
| | | | | 280/851 |
| 4,339,016 | A * | 7/1982 | Gerresheim | B62D 25/188 |
| | | | | 180/89.17 |
| 5,074,573 | A | 12/1991 | Dick | |
| 6,007,102 | A | 12/1999 | Helmus | |
| 8,424,914 | B2 * | 4/2013 | Honzek | A01C 15/006 |
| | | | | 280/834 |
| 2005/0093288 | A1 | 5/2005 | Kim | |
| 2009/0273176 | A1 * | 11/2009 | Ulgen | B62D 25/182 |
| | | | | 280/851 |
| 2010/0253034 | A1 * | 10/2010 | Crismon | B62D 25/163 |
| | | | | 280/154 |
| 2016/0128278 | A1 * | 5/2016 | Rau | A01D 65/08 |
| | | | | 293/58 |
| 2017/0334486 | A1 * | 11/2017 | Plebani | B62D 25/161 |
| 2019/0118874 | A1 * | 4/2019 | Ibanez Moreira | F16D 65/807 |

FOREIGN PATENT DOCUMENTS

GB            670888      *   4/1952
WO      2016/075573  A1       5/2016

OTHER PUBLICATIONS

European Patent Office, International Search Report for EP Application No. 17 19 8248, dated Mar. 28, 2018.

* cited by examiner

FENDER ASSEMBLY FOR A TRACTOR

BACKGROUND

Field of the Invention

The present invention relates to a fender assembly for a vehicle, preferably for an agricultural tractor, and a tractor having such a fender assembly.

Discussion of Related Art

In agricultural or constructional vehicles, fenders or mudguards are often provided to prevent dirt or other debris from being launched into the air by the movement of the vehicle wheels over ground. For vehicles of relatively increased size, such fenders or mudguards can be of relatively large construction, to accommodate increased wheel size.

For any vehicle, ease of access to internal components of the vehicle is a continual concern when performing service or repair operations. As a result, the relatively large size of fenders or mudguards on large vehicles can act to impede easy access to internal vehicle components.

International patent application publication number WO 2016/075573 describes an agricultural tractor having a mudguard device which is rotatable about an axis, to allow for access to tractor components inboard of the mudguard. However, such improved access is still impeded by the adjusted rotational position of the mudguard on the tractor.

Accordingly, it is an object of the invention to provide a fender assembly which allows for increased access to tractor components, while further providing additional constructional advantages.

SUMMARY OF THE INVENTION

Accordingly, there is provided a fender assembly for a tractor, the fender assembly comprising:

a first fender part to be positioned above a wheel of a tractor; and a second fender part mounted to the first fender part via a rail, the second fender part moveable on the rail along a path substantially parallel to a portion of the circumference of the wheel of the tractor, wherein the rail has a partial spiral or helical shape such that as the second fender part is moved along the rail, the second fender part moves rotationally and outwardly relative to the first fender part.

By providing a spiral or helical rail, the second fender part is arranged to move in a partially helical path away from a position above the tractor wheel. The second fender part effectively moves outwardly from a tractor to which the fender assembly is mounted, and depending on the initial position of the second fender part, the part may move in a relative downward or upward direction. This allows for the second fender part to be moved away from the tractor, which can allow for ease of access to tractor components normally positioned beneath or adjacent a fender. In addition, the second fender part can be moved to a position which allows for the fender part to be more easily accessed by an operator standing on the ground next to a tractor.

Preferably, the rail is configured such that the second fender part is moveable between:

a first location where the second fender part is positioned above a tractor wheel and adjacent to the main body of the tractor, and a second location where the second fender part is rotationally moved from the first location, and outward from the main body of the tractor.

In a first embodiment, the second fender part comprises a second fender body extending along a portion of the circumference of an adjacent tractor wheel, wherein the rail is provided on the second fender body, and wherein the first fender part comprises a fixed carrier positioned above the adjacent tractor wheel and coupled to the rail, the second fender body moveable relative to the fixed carrier by movement of the rail on the carrier.

In this embodiment, the second fender body may form the entire fender of the tractor, wherein the entire fender can be moved down and outwardly away from the tractor by movement on the carrier. Such a configuration can allow for relatively unhindered access to components inboard of the tractor wheel, without the tractor fender presenting an obstruction. In this case, the first fender part may be provided as a relatively lightweight frame or strut construction for mounting to a tractor body, or to a wheel carrier of a tractor. It will be understood that such an embodiment may be particularly suitable for use as a fender assembly for front wheels of a tractor.

In a second embodiment, the first fender part comprises a first fender body extending along a portion of the circumference of an adjacent tractor wheel, wherein the rail is provided on the first fender body, and wherein the second fender part comprises a second fender body having a shuttle coupled to and moveable along the rail.

In this embodiment, the first fender body and the second fender body may form two parts of a single fender. In such a case, the first fender body may continue to act as a fender when the second fender body has been moved down and out from the tractor. It will be understood that such an embodiment may be particularly suitable for use as a fender assembly for the rear of a tractor, e.g. above tractor rear wheels or continuous tracks.

Preferably, the second fender part comprises a storage device, such as a reservoir or a storage tank.

Preferably, second fender part comprises a fuel storage tank.

By providing a fuel storage tank as all or part of the second fender part, accordingly additional fuel storage can be positioned on the tractor in a relatively unobtrusive location.

Preferably, the second fender part comprises a nozzle for the filling of the storage tank, wherein the nozzle is moved to a filling position by movement of the second fender part downwardly and outwardly relative to the first fender part.

Due to the increased wheel or track height of many tractors, a fuel storage tank provided as part of a wheel fender assembly of the invention can allow for easier filling of the storage tank, due to the repositioning of the second fender part to provide easier access to a filling nozzle of the tank.

In an additional or alternative aspect, the second fender part may comprise a storage element in the form of a tool box or storage box, for the storage of tools or implements. As a result, the movement of the second fender part allows for easier access to the storage element, e.g. allowing the opening of a tool box by an operator standing on the ground next to the tractor.

Preferably, the fender assembly comprises an actuator to control movement of the second fender part relative to the first fender part. Additionally or alternatively, the second fender part can be manually moved relative to the first fender part.

Preferably, the fender assembly further comprises a locking mechanism to prevent movement of the second fender part relative to the first fender part.

There is further provided a tractor having at least one fender assembly as described above.

It will be understood that the tractor comprises ground contacting elements in the form of wheels or continuous tracks or both, wherein the at least one fender assembly is arranged adjacent at least one of the ground contacting elements.

In a preferred embodiment, the tractor comprises front and rear ground-contacting elements, wherein the tractor further comprises:

left and right rear fender assemblies for left and right rear ground-contacting elements of the tractor, and left and right front fender assemblies for left and right front ground-contacting elements of the tractor, wherein the left and right front fender assemblies comprise fender assemblies according to the first embodiment of fender assembly described above, and wherein the left and right rear fender assemblies comprise fender assemblies according to the second embodiment of fender assembly described above.

BRIEF DESCRIPTION OF THE DRAWINGS

Embodiments of the invention will now be described, by way of example only, with reference to the accompanying drawings, in which.

DETAILED DESCRIPTION OF THE INVENTION

The drawings are provided by way of reference only, and are to be acknowledged as not to scale. It will be understood that some reference numerals may be omitted from drawings showing views of previously described and illustrated features, for purposes of clarity of drawings.

Figure 1:
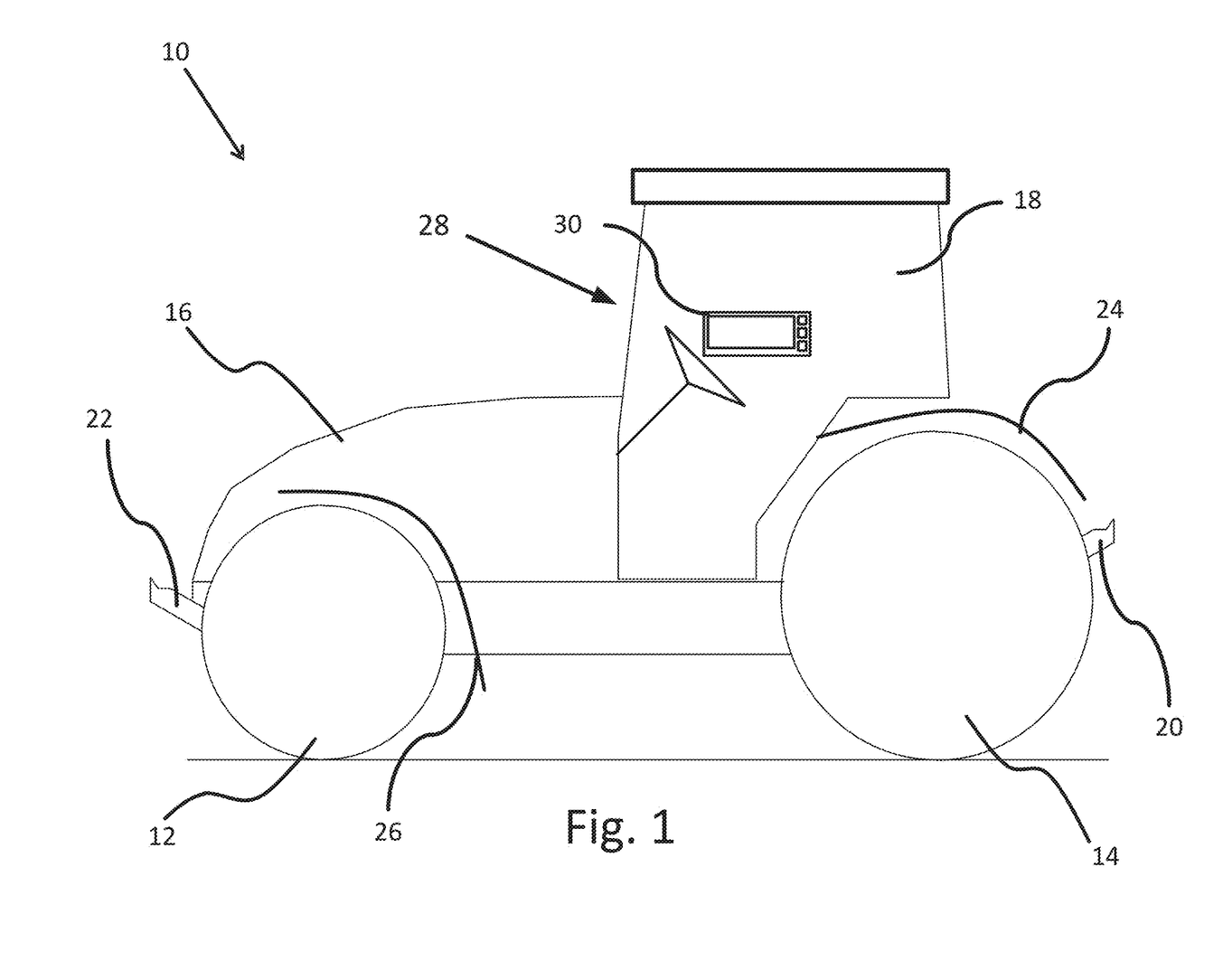
FIG. 1 is a side view of an agricultural tractor having a fender assembly according to the invention.

With reference to FIG. 1, a vehicle according to the invention in the form of an agricultural tractor is indicated at 10. The tractor 10 comprises front wheels 12 and rear wheels 14, a forward engine section 16 and a cab section 18. A rear linkage 20 is provided at the rear of the tractor 10, and a front linkage 22 is provided at the front of the tractor 10. The front and rear linkages 20, 22 can be actuated or moved using associated hydraulic cylinders. Rear fender assembly 24 is provided to cover a portion of the rear wheels 14, while front fender assembly 26 is provided to cover a portion of the front wheels 12. Within the cab 18, an operator station 28 is provided. The operator station 28 comprises a user interface device 30 which is used to display information relating to tractor operation, and to control different elements of the tractor 10. The tractor 10 defines a centreline or longitudinal axis, corresponding to the forward-reverse directions of the tractor shown in FIG. 1.

Figure 2:
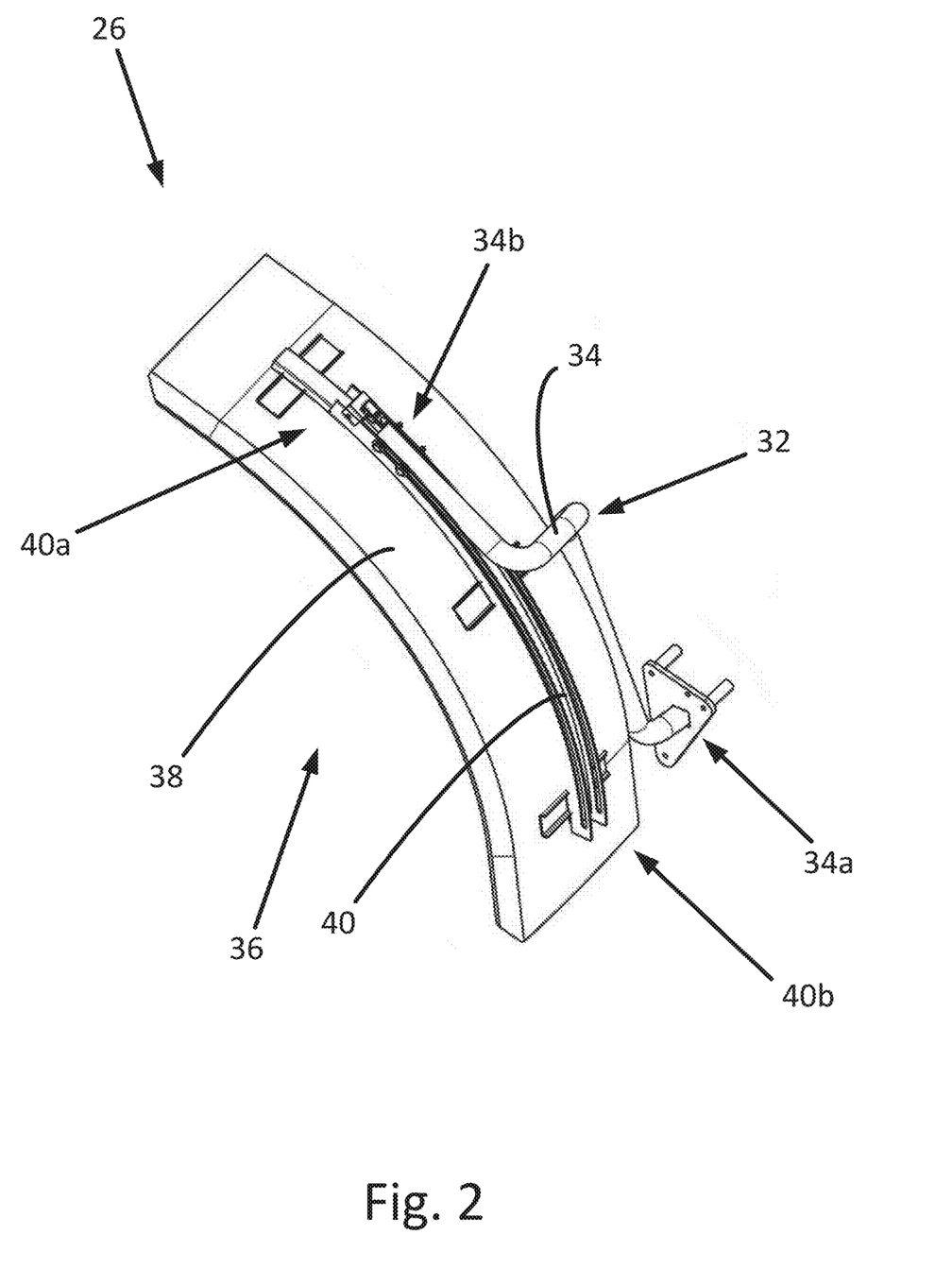
FIG. 2 is a perspective view of a fender assembly according to a first embodiment of the invention.
Figure 3:
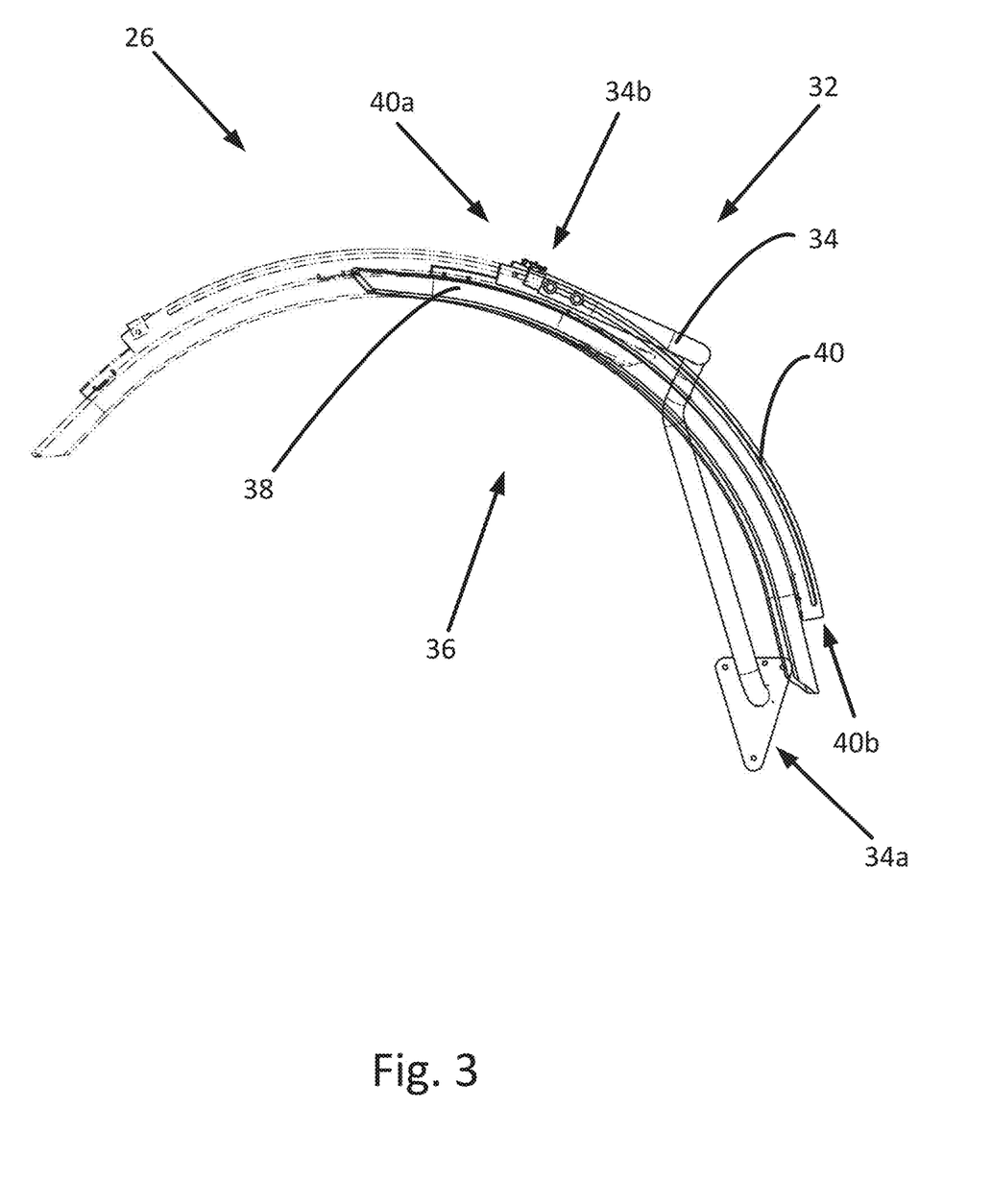
FIG. 3 is a side plan view of the fender assembly of FIG. 2.
Figure 4:
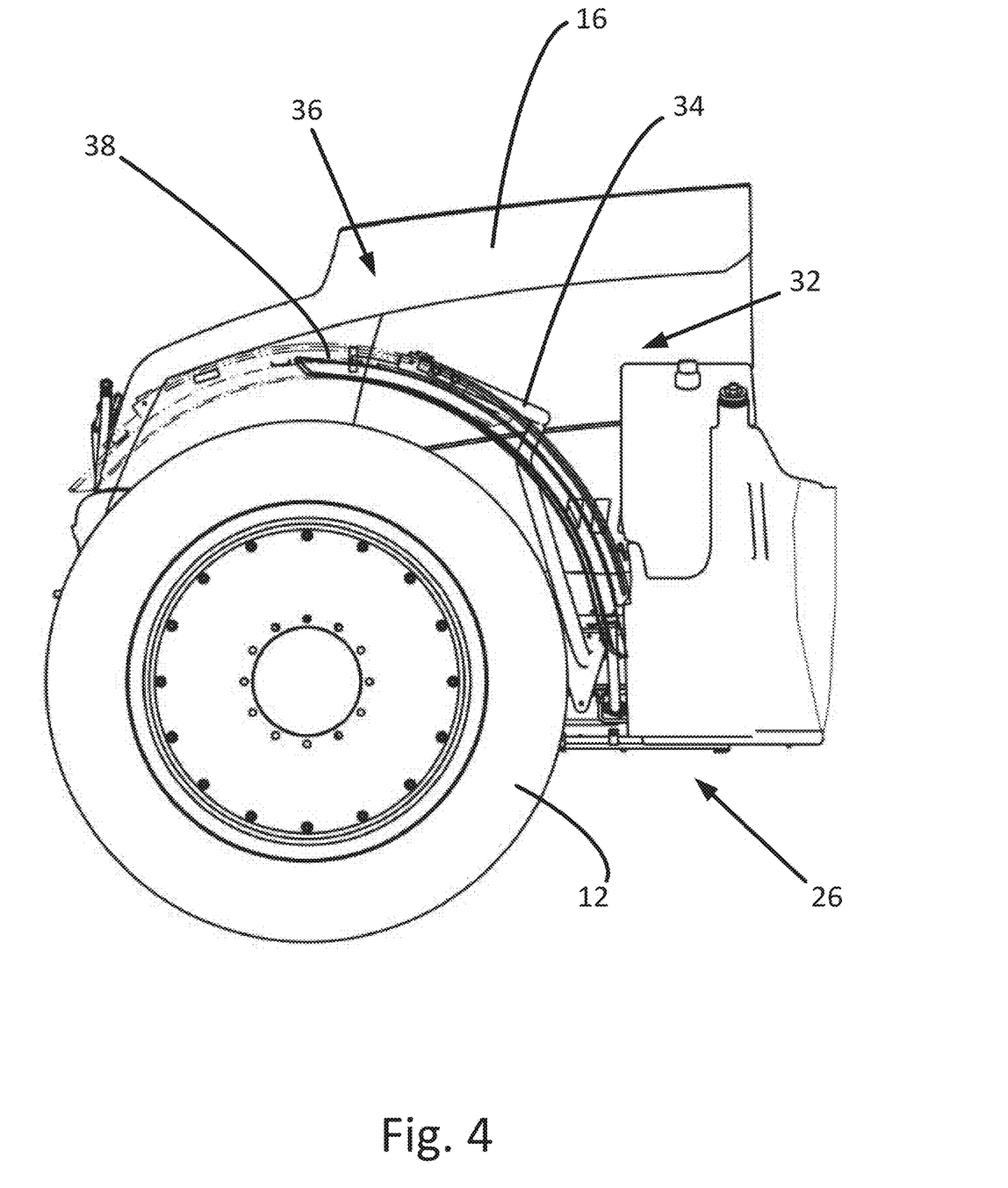
FIG. 4 is an enlarged view of a portion of a tractor having the fender assembly of FIG. 2.

A first embodiment of a fender assembly according to the invention is illustrated in FIGS. 2-4, preferably provided as a front fender assembly 26. The front fender assembly 26 comprises a first fender part 32 in the form of a first fender body or carrier arm 34 arranged to be fixed to the tractor 10 at a first end 34a of the arm 34. The first end 34a of the carrier arm 34 may be mounted to the frame or chassis of the tractor 10, but preferably the carrier arm 34 is mounted to a steering knuckle or wheel carrier (35, FIGS. 5A and 5B) of the front wheel 12, such that the carrier arm 34 and the fender assembly 26 moves with the wheel 12. The carrier arm 34 projects from the first end 34a such that the opposed second end 34b of the carrier arm 34 is located above the front wheel 12.

The front fender assembly 26 further comprises a second fender part 36. The second fender part 36 comprises a second fender body 38 having a substantially arcuate fender shape which is arranged to substantially follow a portion of the circumference of a front wheel 12 of the tractor 10, the second fender body 38 to be arranged as a fender adjacent a front wheel 12 of the tractor 10. A rail 40 is provided on the second fender body 38, the rail arranged to couple with the second end 34b of the carrier arm 34, such that the second fender part 36 is moveable relative to the first fender part 32, by movement of the second end 34b of the carrier arm 34 in the rail 40. It will be understood that the second end 34b of the carrier arm 34 and the rail 40 of the second fender body 38 are constructed as complimentary elements, such that the second end 34b of the carrier arm 34 acts as a shuttle to move along the rail 40.

The rail 38 extends along a portion of the length of the arcuate second fender body 38, such that movement of the second fender part 36 along the second end 34b of the carrier arm 34 results in a rotational movement of the second fender body 38, substantially parallel to the circumference of the front wheel 12. In addition, and with reference to the top-down views shown in FIGS. 5A and 5B, the rail 40 extends at an angle to the main longitudinal axis of the tractor 10. Accordingly, the rail 40 comprises a partial spiral or helical shape, such that movement of the second fender part 36 along the second end 34b of the carrier arm 34 results in the movement of the second fender body 38 outwardly away from the first end 34a of the carrier arm 34 and away from the main body of the tractor 10 to which the fender assembly 26 is attached.

Figure 5A:
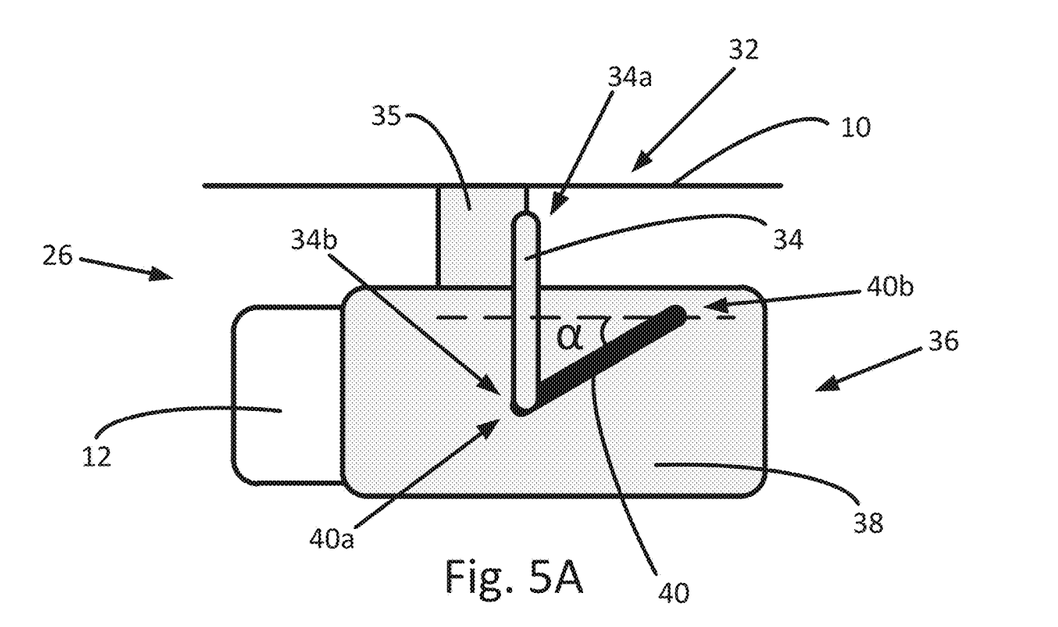
FIGS. 5A and 5B are top plan views illustrating the operation of the fender assembly of FIG. 2.
Figure 5B:
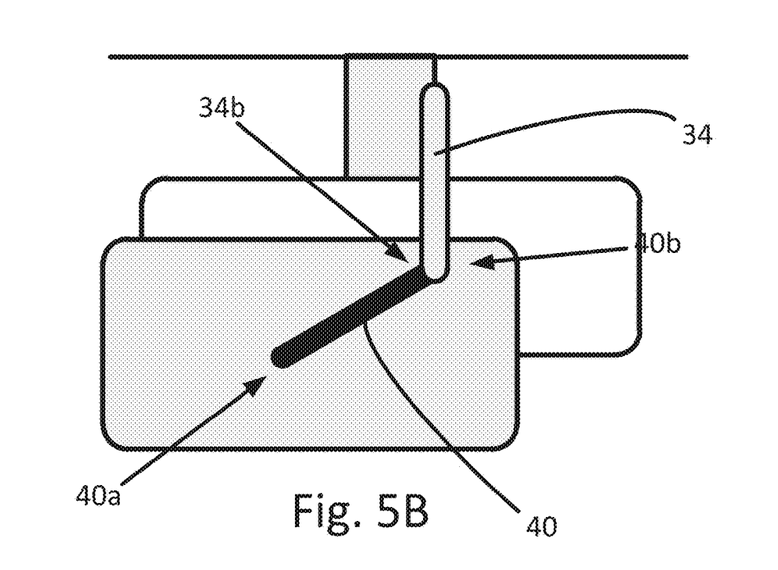

In FIG. 5A, the fender assembly 26 is shown in a normal operating mode when attached to a tractor 10, wherein the second end 34b of the carrier arm 34 is located at a first end 40a of the rail 40, with the result that the second fender body 38 is appropriately positioned above the front wheel 12 to prevent dirt or other debris being raised by the wheel 12. The fender assembly 26 allows for the positioning of the fender in a service or repair position, as shown in FIG. 5B. Here the second fender part 36 has been moved relative to the first fender part 34, with the result that the second end 34b of the carrier arm 34 is located at an opposed second end 40b of the rail 40. Accordingly, the second fender body 38 has been rotated in an outward direction to a position away from the main body of the tractor 10 (and as indicated in broken-line outline in FIGS. 3 and 4).

Figure 6A:
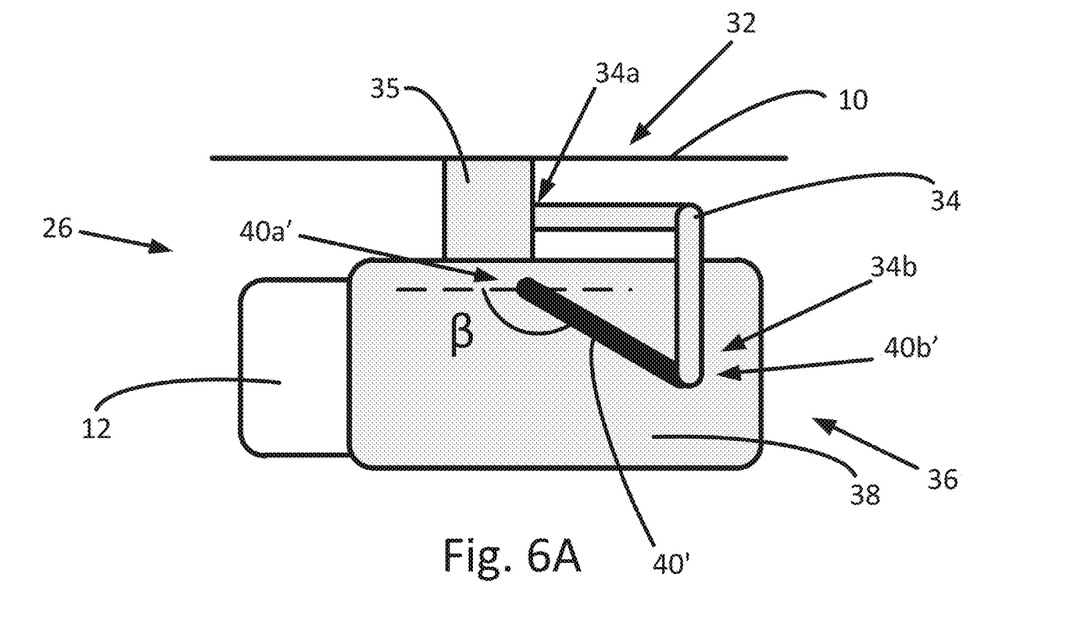
FIGS. 6A and 6B are top plan views illustrating the operation of an alternative construction of the fender assembly of FIG. 2.
Figure 6B:
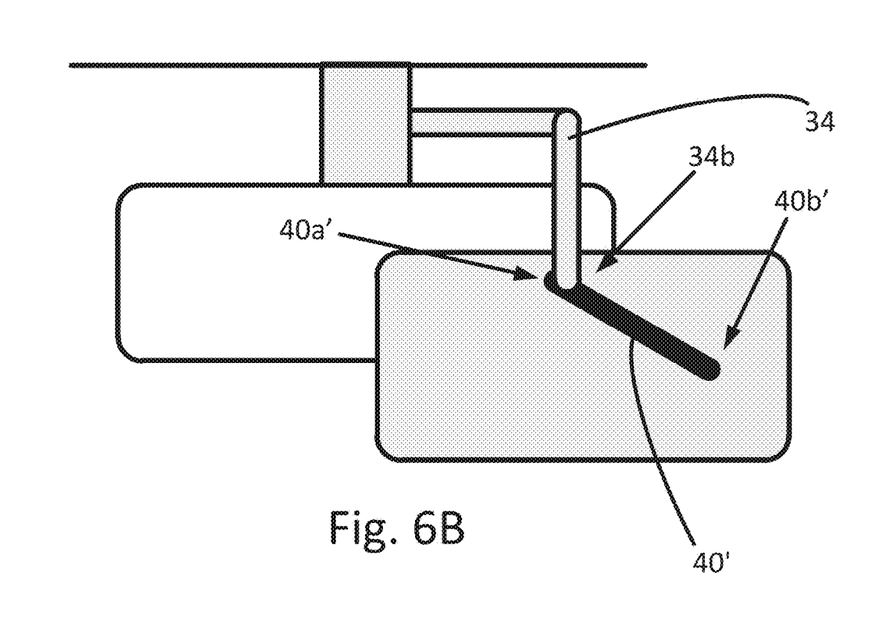

In the construction shown in FIGS. 5A and 5B, the rail 40 is shown extending at an acute angle α to the centreline or general longitudinal axis of the tractor 10 such that the movement of the second fender part 36 results in a rotation of the second fender body 38 in a forward direction with regard to the tractor 10. An alternative construction of the embodiment of FIGS. 2-4 is shown in FIGS. 6A and 6B, wherein the rail 40' is shown extending at an obtuse angle β to the general longitudinal axis of the tractor 10. In this construction, when the fender assembly 26 is in a normal operating mode as shown in FIG. 6A, the second end 34b of the carrier arm 34 is located at the second end 40b' of the rail 40'. As the second fender part 36 is moved to a service or repair position away from the main body of the tractor 10 as shown in FIG. 6B, the second fender body 38 is rotated in a reverse direction with regard to the tractor 10, such that the second end 34b of the carrier arm 34 is located at the first end 40a' of the rail 40'.

By providing a two-part fender assembly 26, wherein the second fender part 36 is moveable relative to the first fender part 34 along a rail 40, 40', accordingly the second fender part 36 may be moved away from the body of an adjacent tractor 10 to a service or repair position, to allow for easier access to components of the tractor 10 which are arranged inboard of the fender assembly 26 and the front wheel 12.

Figure 7:
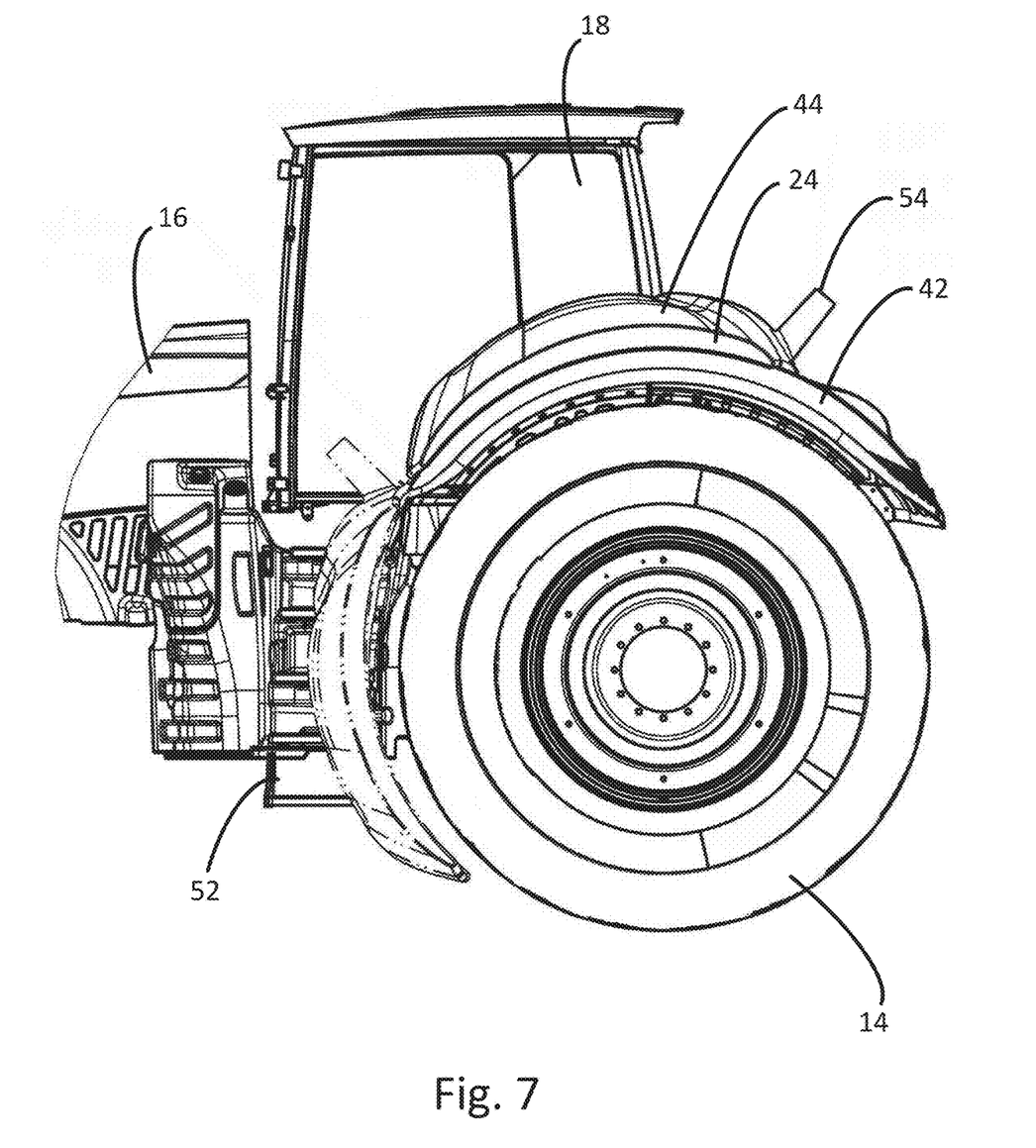
FIG. 7 is an enlarged view of a portion of a tractor having a fender assembly according to a second embodiment of the invention.
Figure 8:
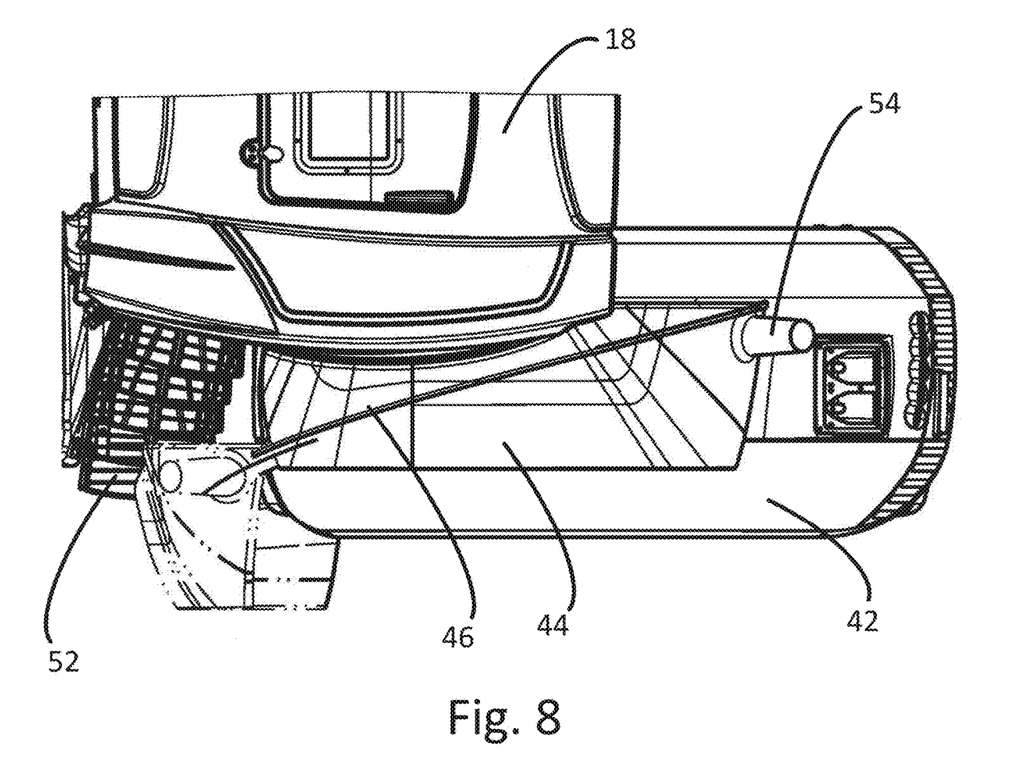
FIG. 8 is a top plan view of the fender assembly of FIG. 7.

A second embodiment of a fender assembly according to the invention is illustrated in FIGS. 7 and 8, indicated at rear fender assembly 24. The rear fender assembly 24 comprises a first fender part 42 comprises a first fender body having a substantially arcuate shape at least partly forming a rear fender or mudguard for a rear wheel 14 of the tractor 10. The assembly 24 further comprises a second fender part 44 provided on the first fender part 42. The second fender part 44 is arranged above the first fender part 42, the second fender part 44 comprising a second fender body which is an extension of a rear fender or mudguard for a rear wheel 14 of the tractor 10.

In this embodiment, the second fender part 44 may be used as a storage element, arranged to provide additional storage space on the tractor 10. Easy access to the storage element by an operator on the ground can be provided accessed through appropriate movement of the second fender part 44 relative to the first fender part 42. The storage element may comprise a tool box or other implement storage. In a particularly preferred embodiment, the second fender part 44 comprises a liquid reservoir or tank, preferably a fuel tank. The use of the second fender part 44 as a fuel tank can provide an additional or auxiliary fuel storage compartment, thereby increasing the fuel capacity of the tractor 10. It will be understood that the fuel tank of the second fender part 44 is be provided with suitable fluid connections (not shown) for the coupling of the fuel tank with the internal fuel system of the tractor 10.

Figure 9:
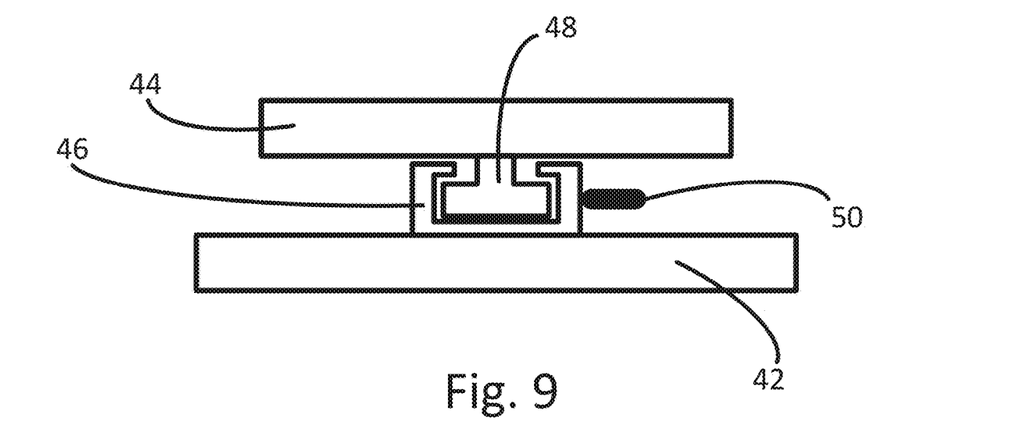
FIG. 9 is a cross-sectional schematic view of the fender assembly of FIG. 7.

With reference to the illustrative schematic cross-sectional view shown in FIG. 9, a rail 46 is provided on the first fender body of the first fender part 42, which is arranged to couple with a shuttle 48 provided on the second fender body of the second fender part 44. As a result, the second fender part 44 is moveable relative to the first fender part 42, along the length of the rail 46. As with the first embodiment described above, and as can be seen in FIG. 8, the rail 46 comprises a partial spiral or helical shape, such that movement of the second fender part 44 along the rail 46 results in the movement of the second fender part 44 outwardly away the main body of the tractor 10 to which the fender assembly 26 is attached. With reference to the top plan view shown in FIG. 8, by the outward rotational movement of the second fender part 44 along the rail 46, the fender part 44 can be moved to a location which is more accessible for an operator standing on the ground, and which allows for the movement of the second fender part 44 which avoids other tractor components, e.g. access steps 52 shown in FIG. 8. Such an accessible location is indicated in broken-line outline in FIGS. 7 and 8.

In the case where the second fender part 44 comprises a liquid tank such as a fuel tank, the fender part 44 is preferably provided with a nozzle 54 for the filling or draining of liquid to or from the tank. Accordingly, the movement of the second fender part 44 from a position above the first fender part 42 to a position rotated downwardly and outwardly from the first fender part 42 can allow of easier access to the nozzle 54 by a person on the ground, thereby facilitating easier filling or draining of the tank through the nozzle 54.

The fender assembly 24, 26 can comprise an actuator arranged to control the movement of the second fender part 36, 44 relative to the first fender part 32, 42. Additionally or alternatively, the second fender part 36, 44 may be manually adjustable by an operator. The fender assembly 24, 26 is preferably provided with a locking mechanism to prevent movement of the second fender part 36, 44 relative to the first fender part 32, 42. An example of such a locking mechanism is illustrated in FIG. 9, wherein a locking bolt 50 is provided on the rail 46, which can be moved to engage with the shuttle 48 to lock the shuttle 48 and the second fender part 44 in position on the rail 46. Other possible locking mechanisms can include remotely-activated actuator locks, electromagnetic locks, hydraulic or pneumatic locks, etc. It will be understood that the movement of the second fender part 36, 44 relative to the first fender part 32, 42 and/or the locking of the second fender part 36, 44 in position relative to the first fender part 32, 42 can be controlled by an operator through use of the in-cab operator station terminal 30, and/or through use of additional operator controls provided on the exterior of the tractor 10, e.g. on the first fender part of the fender assembly.

It will be understood that a fender assembly according to the invention may be provided as part of an agricultural tractor, or may be provided as a kit of parts for assembling as part of a new tractor or for retrofitting to an existing tractor as a replacement for an existing fender. It will be further understood that individual features of the different embodiments may be combined with those of other embodiments, without departing from the invention as claimed. For example, a front fender assembly of a tractor may be provided having a similar construction as the rear fender assembly of the second embodiment as described above, wherein the front fender is provided with a storage element which can be easily accessed through appropriate movement of a fender part of the assembly. Similarly, it will be understood that the rail may be provided on either of the first or second fender parts of the assembly, with a complimentary shuttle element provided on the other of the fender parts.

The use of a fender assembly having first and second fender parts moveable relative to each other through use of a partially spiral or helical rail provides a fender system allowing increased ease of access to tractor components which are located inboard of the fender assembly. In addition, the provision of a moveable second fender part can allow improved access to elements of the second fender part for a person standing on the ground. Such improved access can be used to facilitate access to storage elements provided on the second fender part, such as a fuel tank for a tractor.

The invention is not limited to the embodiments described herein, and may be modified or adapted without departing from the scope of the present invention.

The invention claimed is:

1. A fender assembly in combination with a tractor, the fender assembly comprising:
   a first fender part to be positioned above a wheel of the tractor; and
   a second fender part mounted to the first fender part via a rail, the second fender part moveable on the rail along a path substantially parallel to a portion of the circumference of the wheel of the tractor,
   wherein the rail has a partial spiral or helical shape such that as the second fender part is moved along the rail, the second fender part moves rotationally and outwardly relative to the first fender part and to the tractor.

2. The fender assembly combination as claimed in claim 1, wherein the rail is configured such that the second fender part is moveable between:
   a first location where the second fender part is positioned above a tractor wheel and adjacent to a main body of the tractor, and
   a second location where the second fender part is moved down from the first location, and outward from the main body of the tractor.

3. The fender assembly combination as claimed in claim 1, wherein the second fender part comprises a second fender body extending along a portion of the circumference of the adjacent tractor wheel,
   wherein the rail is provided on the second fender body, and
   wherein the first fender part comprises a fixed carrier positioned above the adjacent tractor wheel and coupled to the rail, the second fender body moveable relative to the fixed carrier by movement of the rail on the carrier.

4. The fender assembly combination as claimed in claim 1, wherein the first fender part comprises a first fender body extending along a portion of the circumference of an adjacent tractor wheel,
   wherein the rail is provided on the first fender body, and
   wherein the second fender part comprises a second fender body having a shuttle coupled to and moveable along the rail.

5. The fender assembly combination as claimed in claim 1, wherein the second fender part comprises a storage device.

6. The fender assembly combination as claimed in claim 1, wherein the second fender part comprises a fuel storage tank.

7. The fender assembly combination as claimed in claim 1, wherein the second fender part comprises a nozzle for the filling of a storage tank,
   wherein the nozzle is moved to a filling position by movement of the second fender part downwardly and outwardly relative to the first fender part.

8. The fender assembly combination as claimed in claim 1, wherein the second fender part comprises a storage element in the form of a tool box or storage box, for the storage of tools or implements.

9. The fender assembly combination as claimed in claim 1, wherein the fender assembly comprises an actuator to control movement of the second fender part relative to the first fender part.

10. The fender assembly combination as claimed in claim 1, wherein the fender assembly further comprises a locking mechanism to prevent movement of the second fender part relative to the first fender part.

11. A tractor having at least one fender assembly, the fender assembly comprising:
    a first fender part to be positioned above a ground contacting element of the tractor; and
    a second fender part mounted to the first fender part via a rail, the second fender part moveable on the rail along a path substantially parallel to a portion of the circumference of the ground contacting element of the tractor,
    wherein the rail has a partial spiral or helical shape such that as the second fender part is moved along the rail, the second fender part moves rotationally and outwardly relative to the first fender part and to the tractor.

12. The tractor of claim 11, comprising ground contacting elements in the form of wheels or continuous tracks or both,
    wherein the at least one fender assembly is arranged adjacent to at least one of the ground contacting elements.

13. The tractor of claim 11, comprising front and rear ground-contacting elements, wherein the tractor further comprises:
    left and right rear fender assemblies for left and right rear ground-contacting elements of the tractor; and
    left and right front fender assemblies for left and right front ground-contacting elements of the tractor,
    wherein the left and right front fender assemblies comprise fender assemblies wherein the second fender part comprises a second fender body extending along a portion of the circumference of an adjacent tractor ground contacting element,
    wherein the rail is provided on the second fender body, and
    wherein the first fender part comprises a fixed carrier positioned above the adjacent tractor wheel and coupled to the rail, the second fender body moveable relative to the fixed carrier by movement of the rail on the carrier, and
    wherein the left and right rear fender assemblies comprise fender assemblies wherein the first fender part comprises a first fender body extending along a portion of the circumference of an adjacent tractor ground contacting element,
    wherein the rail is provided on the first fender body, and
    wherein the second fender part comprises a second fender body having a shuttle coupled to and moveable along the rail.

* * * * *